United States Patent
Mangal et al.

(10) Patent No.: US 10,884,418 B2
(45) Date of Patent: Jan. 5, 2021

(54) VEHICLE ROUTE PLANNING BASED ON INSTANCES OF OTHER VEHICLES STOPPING AUTOMATED OPERATION

(71) Applicant: Aptiv Technologies Limited, St. Michael (BB)

(72) Inventors: Nandita Mangal, Palo Alto, CA (US); Michael H. Laur, Mission Viejo, CA (US)

(73) Assignee: Aptiv Technologies Limited, St. Michael (BB)

( * ) Notice: Subject to any disclaimer, the term of this patent is extended or adjusted under 35 U.S.C. 154(b) by 366 days.

(21) Appl. No.: 15/963,145

(22) Filed: Apr. 26, 2018

(65) Prior Publication Data

US 2019/0332113 A1    Oct. 31, 2019

Related U.S. Application Data

(60) Provisional application No. 62/662,408, filed on Apr. 25, 2018.

(51) Int. Cl.
*G05D 1/02* (2020.01)
*G01C 21/34* (2006.01)

(52) U.S. Cl.
CPC ....... *G05D 1/0214* (2013.01); *G01C 21/3461* (2013.01); *G01C 21/3492* (2013.01); *G05D 2201/0213* (2013.01)

(58) Field of Classification Search
CPC ............ G01C 21/3461; G01C 21/3415; G05D 1/0214; G08G 1/0968; G08G 21/3492
See application file for complete search history.

(56) References Cited

U.S. PATENT DOCUMENTS

| | | | |
|---|---|---|---|
| 8,880,272 B1 * | 11/2014 | Ferguson | B60W 30/10 701/26 |
| 9,079,587 B1 * | 7/2015 | Rupp | B60W 40/06 |
| 9,688,288 B1 * | 6/2017 | Lathrop | G01C 21/3461 |
| 10,473,470 B2 * | 11/2019 | Iagnemma | G01C 21/30 |
| 2005/0080558 A1 | 4/2005 | Kasai | |
| 2017/0234689 A1 * | 8/2017 | Gibson | G05D 1/0061 701/25 |
| 2017/0236210 A1 * | 8/2017 | Kumar | G05D 1/0061 705/4 |
| 2017/0308094 A1 | 10/2017 | Abe et al. | |

(Continued)

FOREIGN PATENT DOCUMENTS

WO    2016/135561 A1    9/2016

OTHER PUBLICATIONS

European Search Report for Application No. 19169899.2, European Patent Office, dated Sep. 16, 2019.

*Primary Examiner* — Ramsey Refai
(74) *Attorney, Agent, or Firm* — Colby Nipper PLLC

(57) ABSTRACT

A vehicle control system includes a receiver and a controller-circuit. The receiver is configured to receive a report of a control-event at a location. The control-event is characterized as an other-vehicle changing operation from an automated-mode of operation. The controller-circuit is in communication with the receiver. The controller-circuit is configured to, in response to receiving the report of the control-event at the location, plan a route for a host-vehicle in accordance with the location of the control-event, and operate the host-vehicle in accordance with the route.

16 Claims, 3 Drawing Sheets

(56) References Cited

U.S. PATENT DOCUMENTS

2018/0023966 A1\* 1/2018 Iwai ................... G08G 1/0112
　　　　　　　　　　　　　　　　　　　　　701/423
2018/0087914 A1　 3/2018 Bravo et al.

\* cited by examiner

VEHICLE ROUTE PLANNING BASED ON INSTANCES OF OTHER VEHICLES STOPPING AUTOMATED OPERATION

TECHNICAL FIELD OF INVENTION

This disclosure generally relates to a vehicle control system, and more particularly relates to a system that plans a route based on locations of instances where other vehicles were unable to operate in an automated mode.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only, and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
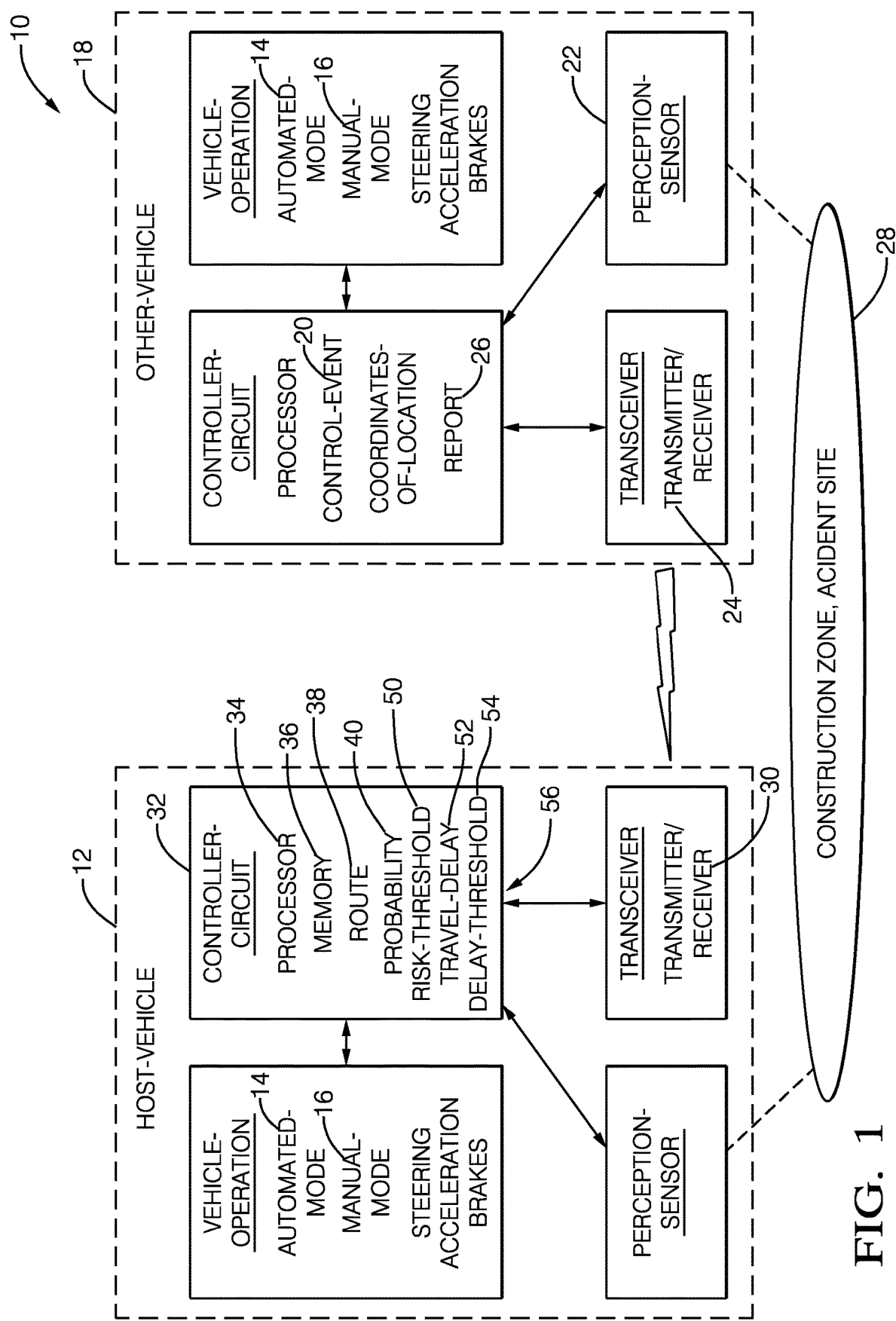
FIG. 1 is a diagram of vehicle control system in accordance with one embodiment.

FIG. 1 illustrates a non-limiting example of a vehicle control system 10, hereafter referred to as the system 10, that generally operates an automated vehicle, e.g. a host-vehicle 12, based on or in accordance with information provided from an other-vehicle 18. The host-vehicle 12 and the other-vehicle 18 may be characterized as an automated vehicle. As used herein, the term automated vehicle may apply to instances when the host-vehicle 12 and the other-vehicle 18 is being operated in an automated-mode 14, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to provide route guidance to a destination that avoids situations where the other-vehicle 18 as not operated in the automated-mode 14 because of, for example, the presence of a construction-zone, an accident-site, or a disabled vehicle.

The system 10 (or the method 100, see FIG. 3) selects a route for the host-vehicle 12 that, if possible and/or advantageous, avoids locations where a takeover-event (where a human-operator deliberately or forcibly takes over control of a vehicle operating in the automated-mode), or a handover-event (where a vehicle operating in the automated-mode hands over control of the vehicle to a human-operator), or a stop-event (a vehicle operating in the automated-mode stops the vehicle for any one of various reasons, stop-event includes the so called safe-stop-event that steers the vehicle to a safe location before stopping) has occurred to the other-vehicle 18. Instances of a takeover-event, or a handover-event, or a stop-event are hereafter generally referred to as a control-event 20.

By way of example and not limitation, an instance of the control-event 20 may occur when lane-markings of a roadway, or boundaries of the roadway itself, are obscured or removed due to ongoing road construction. As another non-limiting example, an accident (e.g. a collision of two vehicles) or disabled vehicle may be obstructing part of a roadway such that only one travel-lane is available for use by two-way traffic. A perception-sensor 22 (e.g. camera, radar, lidar, ultrasonic-transducer, or any combination thereof) of the other-vehicle 18, and/or available data processing of the information from the perception-sensor 22 may be ineffective to determine a safe travel-path for the other-vehicle 18, so vehicle-operation of the other-vehicle 18 may be handed-over to a human-occupant (not shown) of the other-vehicle 18, or vehicle-operation stops the other-vehicle 18, possibly temporarily, when for some reasons the occupant is unable to take control (e.g. underage or incapacitated), or there is no occupant to take control present in the other-vehicle 18.

The other-vehicle 18 is equipped with a transmitter 24 so the instance of the control-event 20 can be broadcast as a warning to any other vehicles (e.g. to the host-vehicle 12) that are in or approaching the area where the control-event 20 occurred. The transmitter 24 may be part of a known type of transceiver such as a cellular-phone network transceiver, a Wi-Fi transceiver, or a dedicated-short-range-communications (DSRC) transceiver, as will be recognized by those in the wireless communications arts. The transmitter 24 may be used to transmit a report 26 that may include, but is not limited to, information about the control-event 20 such as a location 28 (e.g. GPS coordinates) where the control-event 20 occurred and/or information regarding the type of the control-event 20, e.g. takeover-event, handover-event, or stop-event. It is also contemplated that the report 26 could include data from the perception-sensor 22 (e.g. a video feed) that could be useful to the system 10 to determine whether the host-vehicle should avoid the location 28 or should travel through the location 28.

It follows that as part of the system 10, the host-vehicle 12 is equipped with a receiver 30 configured to receive the report 26 of the control-event 20 at a location 28. As suggested previously, the control-event 20 may be characterized as an instance of the other-vehicle 18 changing operation from the automated-mode 14 of operation to, for example, the manual-mode 16 of operation via a takeover-event or a handover-event, or optionally a stop-event that operates the other-vehicle 18 to an automated-stop, preferably a safe-stop Like the transmitter 24, the receiver 30 may be part of a known type of transceiver such as a cellular-phone network transceiver, a Wi-Fi transceiver, or a dedicated-short-range-communications (DSRC) transceiver, as will be recognized by those in the wireless communications arts.

The system 10 equips the host-vehicle 12 with a controller-circuit 32 that is in communication with the receiver 30, e.g. connected to an input 56 of the controller-circuit 32. The communication may be by way of, but is not limited to, wires, optical-fiber, or wireless communications as will be recognized by those in the art. The controller-circuit 32, hereafter sometimes referred to as the controller 32, may include one or more instances of a processor 34 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 32, it is recognized that the functions of the controller 32 may be shared or distributed among several instances of controllers that are each configured for some specific task. Hereafter, any reference to the controller 32 being configured for something is to also be interpreted as suggesting that the processor 34 may also be configured for the same thing. The controller 32 may include memory 36, i.e. non-transitory computer-readable storage-medium, including non-volatile memory, such as electrically erasable programmable read-only memory (EEPROM) for storing one or more routines, thresholds, and captured data. The memory 36 may be part of the processor 34, or part of the controller 32, or separate from the controller 32 such as remote memory stored in the cloud. The one or more routines may be executed by the controller 32 or the processor 34 to perform steps for determining how to operate the host-vehicle 12 based on signals received by the controller 32 from, but not limited to, the receiver 30 as described herein.

The controller-circuit 32 is configured to, in response to receiving the report 26 of the control-event 20 at the location 28, plan a route 38 for a host-vehicle 12 in accordance with the location 28 of the control-event 20, and operate the host-vehicle 12 in accordance with the route 38. As will be described in more detail below, the route 38 selected for the host-vehicle 12 may avoid traveling to or through the location 28. Alternatively, in some circumstances the route 38 may travel through the location 28 even though the control-event 20 occurred to the other-vehicle 18.

It is contemplated that a record of the control-event by the other-vehicle 18 and a history of other control-events by other vehicles may be stored in a cloud database so that a history of control-events by other vehicles can be used by the host-vehicle 12 to determine the likelihood, i.e. a probability 40, that the host-vehicle 12 may also be subjected to or repeat a control-event if the host-vehicle 12 travels to or through the location 28. While FIG. 1 could be interpreted to suggest that the probability 40 is determined or calculated by the controller 32 or the processor 34, it is contemplated that the probability 40 may be calculated by some remote, off-board computer and sent to the host-vehicle when the host-vehicle 12 approaches the location or has a previously determined route (determined before whatever caused the control-event 20 has occurred) that travels through the location 28. It is also contemplated that the probability 40 may be different for different vehicles equipped with, for example, different configurations of perception-sensors. It is also contemplated that the control events are classified (e.g. takeover, handover, stop) and the classification may be used to determine the probability 40.

Figure 2:
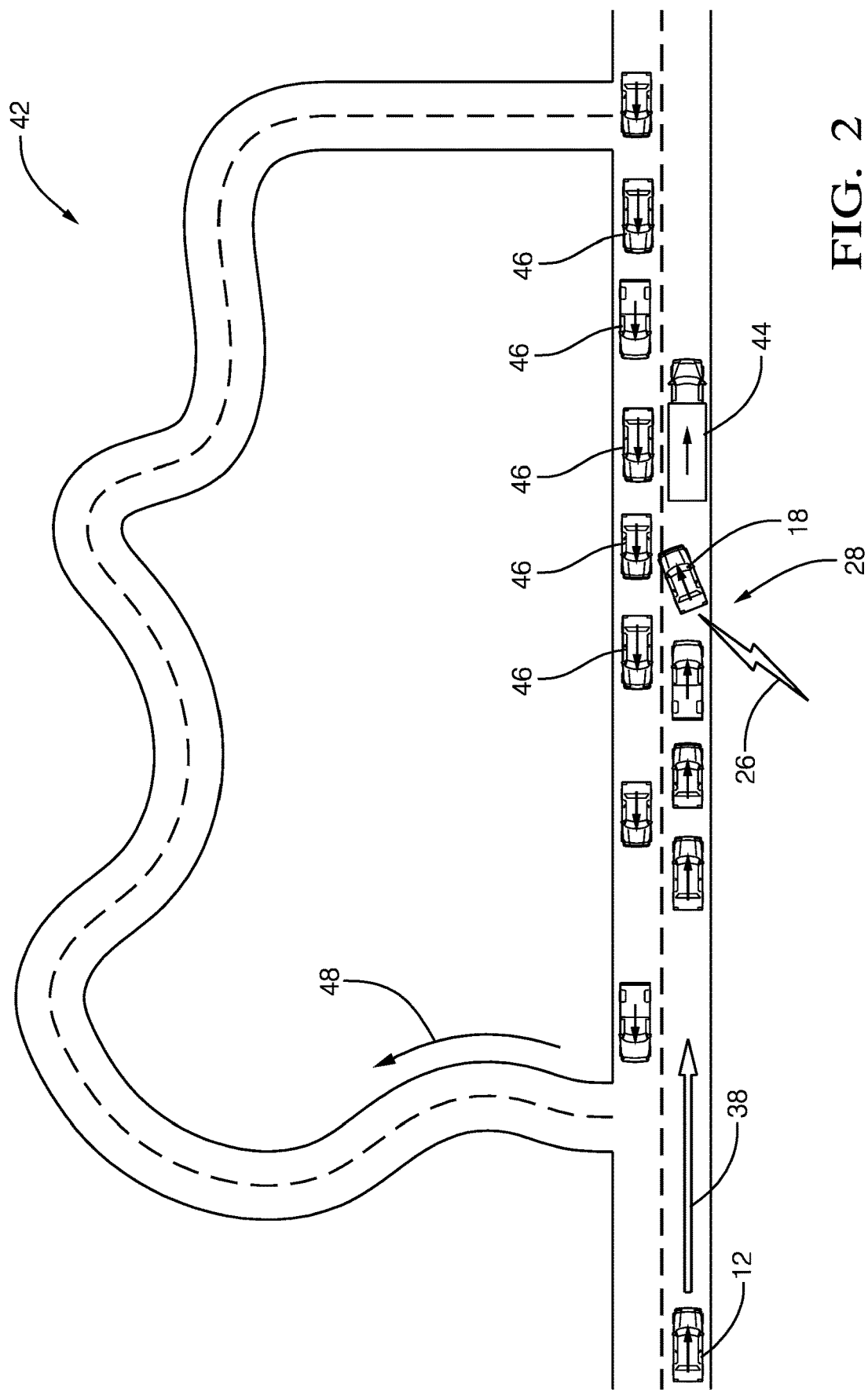
FIG. 2 is an illustration of a scenario encountered by the system of FIG. 1 in accordance with one embodiment.

FIG. 2 illustrates a non-limiting example of a scenario 42 encountered by the host-vehicle 12 equipped with the system 10. In this example, a disabled-vehicle 44 has block the travel-path of the other-vehicle 18, and the opposing-traffic 46 is too dense for the other-vehicle 18 to drive around, i.e. pass, the disabled-vehicle 44. That the other-vehicle 18 has stopped may be an instance of the control-event 20 as the human-operator (not shown) may have recognized that the disabled-vehicle 44 was stalled, and took manual control of the other-vehicle 18, i.e. there was a takeover-event. Alternatively, the automated-controls in the other-vehicle 18 may have detected the disabled-vehicle 44 and notified the human-operator that he/she must take control of the other-vehicle 18, i.e. a handover-event. Those in the automated or autonomous vehicle arts will recognize that the automated controls of the other-vehicle 18 would control vehicle-operation in the automated-mode 14 which may include operation of the steering, the accelerator, brakes, or any combination thereof. As another alternative, the human-operator may have recognized that operating the other-vehicle 18 in the manual-mode 16 would be pointless as the opposing-traffic 46 was too dense, so the human-operator refused the handover request and the automated-controls of the other-vehicle 18 elected to stop the other-vehicle 18.

The other-vehicle 18 is configured to broadcast the report 26 associated with the control-event 20, which includes reporting the location 28 where the control-event 20 occurred. Upon receiving the report 26 by the controller 32 or the processor 34 of the host-vehicle 12 evaluates various options for the route 38. Non-limiting examples of those options are now presented by way of non-limiting examples.

In one embodiment, the system 10 (or the controller 32 or the processor 34) may be configured to simply avoid the location 28 of the control-event 20 by changing the route 38 to follow a detour 48 that avoids the location 28 of the control-event 20. It is recognized that simply avoiding the location 28 regardless of circumstances may not always be possible or preferable. However, in some situation the road may be completely closed and the location 28 must be avoided regardless of any circumstances.

In another embodiment of the system 10, as previously mentioned, the control-event 20 may be ranked or characterized by the probability 40 that the host-vehicle 12 will repeat the control-event 20 at the location 28, and the controller-circuit 32 is configured to plan the route 38 in accordance with the probability 40. For example, if the probability 40 is great, e.g. greater than thirty-three percent (33%), then the controller 32 may decide to take the detour 48 rather than risk excessive travel delay by trying to pass through the location 28. By contrast, the controller-circuit 32 may be configured to plan the route 38 through the location 28 in response to a determination that the probability 40 is less than a risk-threshold 50 (FIG. 1), e.g. less than 33%. In other words, the controller 32 (or the processor 34) elects to take shortest route if probability 40 for that route is relatively low. It is contemplated that this decision process can be used for situations when there are multiple suitable routes, but each possible route passes through a location of a control-event, so the controller 32 chooses the route with lowest probability.

The controller 32 may also utilize historical information of control events when travel time to the location of the control-event is long and there is an indication or suggestion that the probability of repeating the control-event will decrease over time, and there are possibilities to change routing if historical data on control-events does not follow the historical pattern. That is, historical control events can be used to decrease traffic through locations of control-events if the control events occur repetitively. For example, if instead of the disabled-vehicle 44 at the location 28 there were a construction-zone, and even though the other-vehicle 18 experienced a control-event, the presence of a construction working directing traffic, e.g. controlling the alternating traffic direction use of a single lane, the controller 32 may elect to travel through the location 28.

The control-event 20 may also be characterized by a travel-delay 52 through the location 28. That is, the system 10, a remote computer, or a processor or controller-circuit in the other-vehicle 18 may be configured to classify control-events based on how much travel-delay the control-event could cause, or has caused. Accordingly, the controller 32 may be configured to take fastest route even if the distance of that route (e.g. the detour) 48 is longer. Alternatively, the controller-circuit 32 may be configured to plan the route 38 through the location 28 in response to a determination that the travel-delay 52 is less than a delay-threshold 54, e.g. five minutes (5 minutes).

Figure 3:
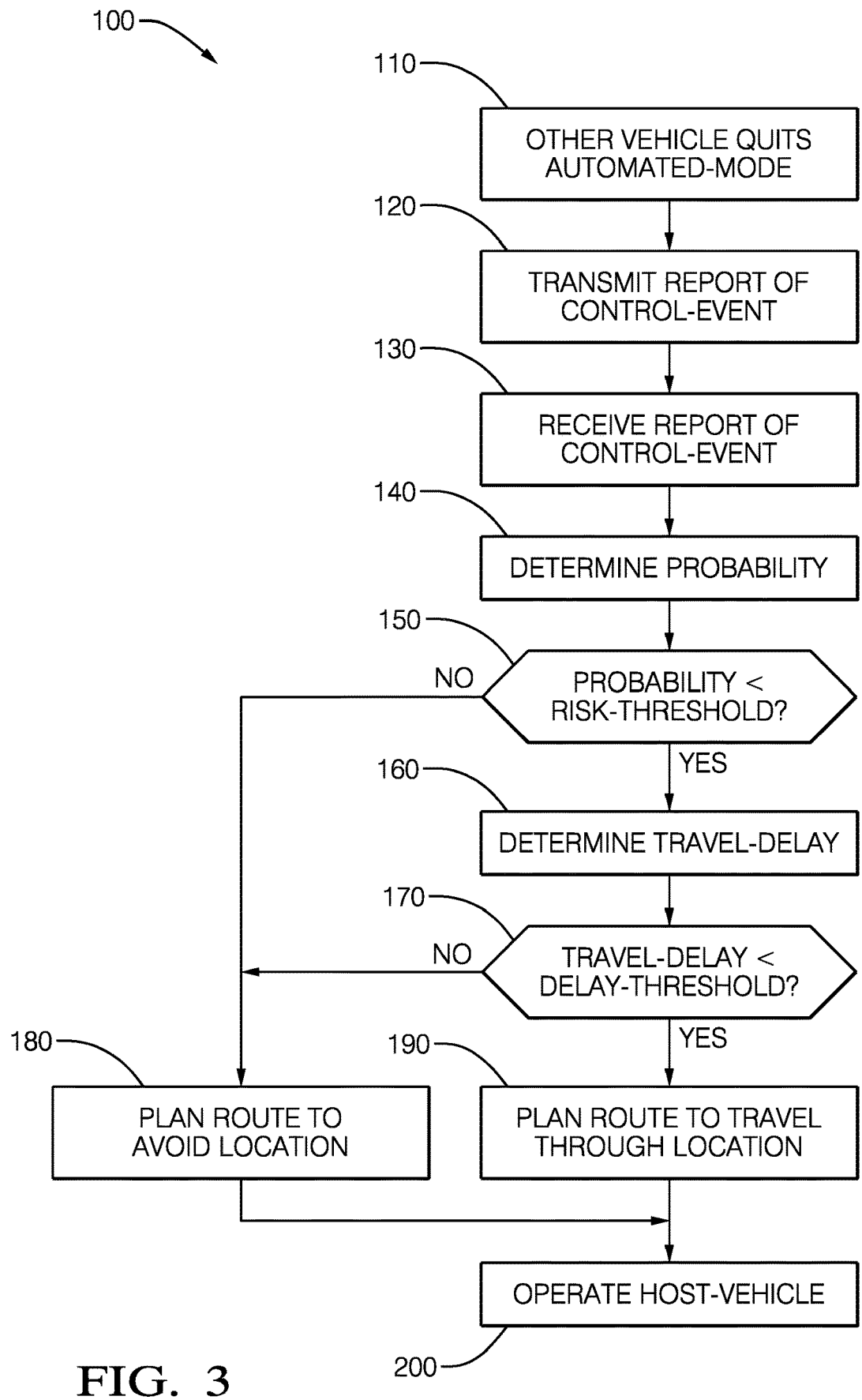
FIG. 3 is a method of operating the system of FIG. 1 in accordance with one embodiment.

FIG. 3 illustrates a non-limiting example of a method 100 of operating the system 10. The method 100 describes steps for a host-vehicle 12 (FIGS. 1 and 2) to use information from an other-vehicle 18 to select a route 38 or a detour 48 that minimizes the effects of a situation that the other-vehicle 18 has experienced. The control-event 20 causes the other-vehicle 18 to quit operation in an automated-mode 14, and possibly start operation in a manual-mode 16 or stop the other-vehicle 18 at the location 28 where the control-event 20 occurred.

Step 110, OTHER-VEHICLE QUITS AUTOMATED-MODE, may include the automated controls of the other-vehicle 18 to identifying an object (e.g. a disabled-vehicle 44) or other conditions (e.g. missing lane-markings or unidentifiable roadway boundaries) that is/are preventing the other-vehicle 18 from continuing to operate in the automated-mode 14, and/or determining that the situation is such that the automated controls of the other-vehicle 18 are unable to continue with operation of the other-vehicle 18 in the automated-mode 14. Those in the automated or autonomous vehicle arts will recognize that the automated controls of the other-vehicle 18 would control vehicle-operation in the automated-mode 14 which may include operation of the steering, the accelerator, brakes, or any combination thereof of the other-vehicle 18. In order for the automated controls of the other-vehicle 18 to quit operating in the automated-mode 14, a human-operator (not shown) in the other-vehicle 18 may be notified with an audible and/or visual request to take control of the other-vehicle 18, i.e. be notified to begin operation in the manual-mode 16.

Step 120, TRANSMIT REPORT OF CONTROL-EVENT, may include operating the transmitter 24 of the other-vehicle 18 to broadcast the report 26 that may include the coordinates of the location 28, and optionally some indication of what caused the control-event 20, e.g. the disabled-vehicle 44.

Step 130, RECEIVE REPORT OF CONTROL-EVENT, may include receiving, by the controller-circuit 32 (or the processor 34) via the receiver 30, the report 26 of a control-event 20 at a location 28 that was broadcast by the other-vehicle 18. The significance of the control-event is that it is characterized as (i.e. indicates that) the other-vehicle 18 has experiences a situation that required changing operation from the automated-mode 14 of operation, i.e. quitting autonomous operation.

Step 140, DETERMINE PROBABILITY, may include characterizing the control-event 20 by a probability 40 that the host-vehicle 12 will repeat the control-event 20 at the location 28. The determination of the probability 40 may be performed by the controller 32 or the processor 34 as suggested in FIG. 1. However, this is not a requirement. Alternatively, the probability 40 may be determine by the other-vehicle 18 and included the report 26 when broadcasted, or the probability 40 may be determined by an off-board (i.e. not on-board the host-vehicle 12 or the other-vehicle 18) computer. The probability 40 may be based solely on information from the perception-sensor 22 on the other-vehicle 18, or may consider additional information such as information or a video feed from a traffic-camera near the location 28 and/or data from other vehicles near the location 28. The probability 40 may also consider any sensing and/or computational differences between the host-vehicle 12 and the other-vehicle 18.

Step 150, PROBABILITY<RISK-THRESHOLD?, may include comparing the probability 40 to a risk-threshold 50 (e.g. 33%) to determine if the host-vehicle 12 will take the risk of delay by traveling to/through the location versus accepting a predictable longer travel time if an alternate route is taken, e.g. the detour 48. If the probability 40 is less than the risk-threshold 50 (YES), then the host-vehicle 12 may proceed toward the location. However, if the probability 40 is greater than the risk-threshold 50 (NO), then method 100 may skip to step 180 so the host-vehicle 12 follows the detour 48 to avoid the location 28 regardless of any further consideration.

Step 160, DETERMINE TRAVEL-DELAY, may include characterizing the control-event 20 with or by a travel-delay 52 through the location 28. Information regarding the number of vehicles that are stopped at the location 28 may be gathered by way of receiving broadcasts from multiple other vehicles that have each experienced their own control-event, or are still operating in the automated-mode 14 but are broadcasting that traffic at the location 28 is stopped, stop and go, or extremely slow. The travel-delay 52 may also be communicated to the host-vehicle 12 from the infrastructure that includes traffic monitoring cameras.

Step 170, TRAVEL-DELAY<DELAY-THRESHOLD, may include comparing the travel-delay 52 to a delay-threshold 54 (e.g. 5 minutes) to determine if the host-vehicle 12 will take the risk of delay by traveling to/through the location 28 versus accepting a predictable longer travel time if an alternate route is taken, e.g. the detour 48. If the travel-delay 52 is less than the delay-threshold 54 (YES), then the host-vehicle 12 may proceed toward the location 28. However, if the travel-delay 52 is greater than the delay-threshold 54 (NO), then method 100 may skip to step 180 so the host-vehicle 12 follows the detour 48 to avoid the location 28 regardless of any further consideration.

In response to the host-vehicle 12 receiving the report 26 of the control-event 20 at the location 28, further planning the route 38 for a host-vehicle 12 is done in accordance with, but not limited to, the location 28 of the control-event, the classification (take-over vs. hand-over vs. stop) of the control-event 20. This further planning can be summarized as electing to avoid the location, so the method 100 executes step 180, or traveling to/through the location 28, so the method 100 executes step 190.

Step 180, PLAN ROUTE TO AVOID LOCATION, may include avoiding the location of the control-event regardless of any predictable travel delay or unlikelihood of the host-vehicle 12 being subject to its own control-event. E.g. the host-vehicle 12 follows the detour 48 regardless of any other considerations.

Step 190, PLAN ROUTE TO TRAVEL THROUGH LOCATION, may include planning the route in accordance with the probability and/or planning the route through the location in response to a determination that the probability is less than a risk-threshold and/or in response to a determination that the travel-delay is less than a delay-threshold. In this non-liming example, both conditions (probability 40<risk-threshold 50 AND travel-delay 52<delay-threshold 54) must be met. However, it is recognized that the decision to travel to/through the location may be made based on the outcome of only one of those tests, e.g. probability 40<risk-threshold 50 OR travel-delay 52<delay-threshold 54, or on the outcome of many other similar tests.

Step 200, OPERATE HOST-VEHICLE, may include operating the host-vehicle 12 in accordance with the route 38 by the controller-circuit 32 or the processor 34. If the host-vehicle 12 is operating in the automated-mode 14, operating the host-vehicle 12 may include operating the steering, accelerator, brakes, or any combination thereof of the host-vehicle 12 to follow the route 38. If the host-vehicle is operating in the manual-mode 16, the operation of the host-vehicle by the controller-circuit 32 may be limited to providing navigation guidance to the human-operator (not shown) in the host-vehicle 12.

Described herein is a first device 32 that includes one or more processors 34, memory 36, and one or more programs 110-200 stored in the memory 36. The one or more programs 110-200 include instructions for performing all or part of the method 100. Also described herein is a non-transitory computer-readable storage-medium 36 comprising one or more programs 110-200 for execution by one or more processors 34 of a first device 32. The one or more programs 110-200 including instructions which, when executed by the one or more processors 34, cause the first device 32 to perform all or part of the method 100.

Accordingly, a vehicle control system (the system 10), a controller 32 for the system 10, and a method 100 of operating the system 10 are provided. The system 10 and the method 100 describes hardware and program steps for a host-vehicle 12 (FIGS. 1 and 2) to use information from an other-vehicle 18 to select a route 38 or a detour 48 that minimizes the effects of a situation that the other-vehicle 18 has experienced. The control-event 20 causes the other-vehicle 18 to quit operation in an automated-mode 14, and possibly start operation in a manual-mode 16 or stop the other-vehicle 18 at the location 28 where the control-event 20 occurred.

While this invention has been described in terms of the preferred embodiments thereof, it is not intended to be so limited, but rather only to the extent set forth in the claims that follow.

We claim:

1. A vehicle control system, said system comprising:
   a receiver configured to receive a report of a control event at a location, said control event is another vehicle changing operation from an automated mode of operation; and
   a controller circuit in communication with the receiver, said controller circuit configured to, in response to receiving the report of the control event at the location, perform operations comprising:
   determine a probability that a host vehicle will repeat the control event at the location;
   determine if the probability is less than a risk threshold;
   plan a route for the host vehicle through the location of the control event in response to determining that the probability is less than the risk threshold; and
   operate the host vehicle in accordance with the route.

2. The system in accordance with claim 1, the controller circuit further performing an operation comprising plan a route for the host vehicle avoiding the location of the control event.

3. The system in accordance with claim 1, wherein the control event is a travel delay through the location, and the controller circuit is configured to plan the route in accordance with the travel delay.

4. The system in accordance with claim 3, wherein the controller circuit is configured to plan the route through the location in response to a determination that the travel delay is less than a delay threshold.

5. A controller circuit for a vehicle control system, said controller circuit comprising:
   an input configured to receive a report from a receiver of a control event at a location, said control event is another vehicle changing operation from an automated mode of operation; and
   a processor configured to, in response to receiving the report of the control event at the location, perform operations comprising:
   determining a probability that a host vehicle will repeat the control event at the location;
   determining if the probability is less than a risk threshold;
   planning a route for the host vehicle through the location of the control event in response to determining that the probability is less than a risk threshold; and
   operating the host vehicle in accordance with the route.

6. The controller circuit in accordance with claim 5, the processor is further configured to perform an operation comprising planning a route for the host vehicle avoiding the location of the control event.

7. The controller circuit in accordance with claim 5, wherein the control event is a travel delay through the location, and the processor is configured to plan the route in accordance with the travel delay.

8. The controller circuit in accordance with claim 7, wherein the processor is configured to plan the route through the location in response to a determination that the travel delay is less than a delay threshold.

9. A method of operating a vehicle control system, said method comprising:
  receiving, by a controller circuit, a report of a control event at a location, wherein said control event is another vehicle changing operation from an automated mode of operation;
  in response to receiving the report of the control event at the location,
    determining a probability that a host vehicle will repeat the control event at the location;
    determining if the probability is less than a risk threshold;
    planning a route for the host vehicle through the location of the control event in response to determining that the probability is less than a risk threshold; and
    operating the host vehicle in accordance with the route by the controller circuit.

10. The method in accordance with claim 9, wherein the method includes planning a route for the host vehicle avoiding the location of the control event.

11. The method in accordance with claim 9, wherein the control event is a travel delay through the location, the method further comprising:
  planning the route in accordance with the travel delay.

12. The method in accordance with claim 11, wherein the method includes planning the route through the location in response to a determination that the travel delay is less than a delay threshold.

13. The system in accordance with claim 2, the operation of plan a route for the host vehicle avoiding the location of the control event performed in response to a determination that the probability is greater than the risk threshold.

14. The controller circuit in accordance with claim 6, the operation of plan a route for the host vehicle avoiding the location of the control event performed in response to a determination that the probability is greater than the risk threshold.

15. The method in accordance with claim 10, the planning a route for the host vehicle avoiding the location of the control event in response to a determination that the probability is greater than the risk threshold.

16. A method comprising:
  receiving, by a controller circuit, a report of a control event at a location, wherein the control event is another vehicle changing operation from an automated mode of operation;
  determining, by the controller circuit, a probability that a host vehicle will repeat the control event at the location;
  planning, by the controller circuit, a route for the host vehicle in accordance with the probability, wherein planning the route comprises:
    planning a route for the host vehicle through the location of the control event responsive to determining that the probability is less than a risk threshold; or
    planning a route for the host vehicle avoiding the location of the control event responsive to determining that the probability is greater than the risk threshold; and
  operating, by the controller circuit, the host vehicle in accordance with the route.

* * * * *